United States Patent [19]
Kim et al.

[11] Patent Number: 5,319,499
[45] Date of Patent: Jun. 7, 1994

[54] VARIABLE-SPEED REGENERATION COMPENSATING APPARATUS FOR DOUBLE AZIMUTH 4-HEAD TYPE VIDEO TAPE RECORDER

[75] Inventors: Yang L. Kim, Suweon, Rep. of Korea; Taniguchi Yasuhiro, Tokyo, Japan

[73] Assignee: SamSung Electronics Co., Ltd., Suwon, Rep. of Korea

[21] Appl. No.: 750,980

[22] Filed: Aug. 28, 1991

[30] Foreign Application Priority Data

Aug. 29, 1990 [JP] Japan .................. 2-226892

[51] Int. Cl.⁵ .............................................. H04N 5/78
[52] U.S. Cl. .................... 360/10.1; 360/10.2; 360/10.3; 358/312
[58] Field of Search ............. 360/10.1, 10.2, 10.3; 358/312

[56] References Cited

U.S. PATENT DOCUMENTS

| 4,611,252 | 9/1986 | Igata et al. ............. | 360/10.3 |
| 4,623,940 | 11/1986 | Matsumoto et al. ........ | 360/10.3 |
| 4,630,136 | 12/1986 | Ogawa et al. ............ | 360/10.1 X |
| 4,878,133 | 10/1989 | Takimoto ................ | 360/10.3 |
| 4,935,826 | 6/1990 | Sin et al. .............. | 360/10.3 X |
| 5,003,406 | 3/1991 | Hatawaka et al. ......... | 360/10.3 |
| 5,031,051 | 7/1991 | Kim ..................... | 358/312 |
| 5,164,864 | 11/1992 | Perroud et al. .......... | 310/10.3 X |
| 5,166,834 | 11/1992 | Mester et al. ........... | 360/10.3 |
| 5,214,515 | 5/1993 | Inoue et al. ............ | 360/10.1 X |

FOREIGN PATENT DOCUMENTS 0059453  9/1982  European Pat. Off. ........... 360/10.1

Primary Examiner—Robert J. Pascal
Assistant Examiner—Haissa Philogene
Attorney, Agent, or Firm—Robert E. Bushnell

[57] ABSTRACT

A variable-speed regeneration compensating apparatus for a double azimuth 4-head type video tape recorder comprises first and second standard speed regenerating heads, first and second low speed regenerating heads, a standard speed regeneration head switching part, a standard speed regeneration envelope detecting part, a low speed regeneration envelope detecting part, an envelope comparing part, a standard speed recorded medium regeneration signal switching part, first and second time constant circuits, a time constant circuit switching part, and a low speed recorded medium variable speed regeneration compensating circuit. Compensation is provided not only to the case where the picture data having undergone a standard speed recording which is subjected to variable speed reproduction, but also to the medium having undergone a low speed recording, and therefore the stripe shaped optical noise is eliminated making the low speed recording/regenerating of video tapes easier.

21 Claims, 8 Drawing Sheets

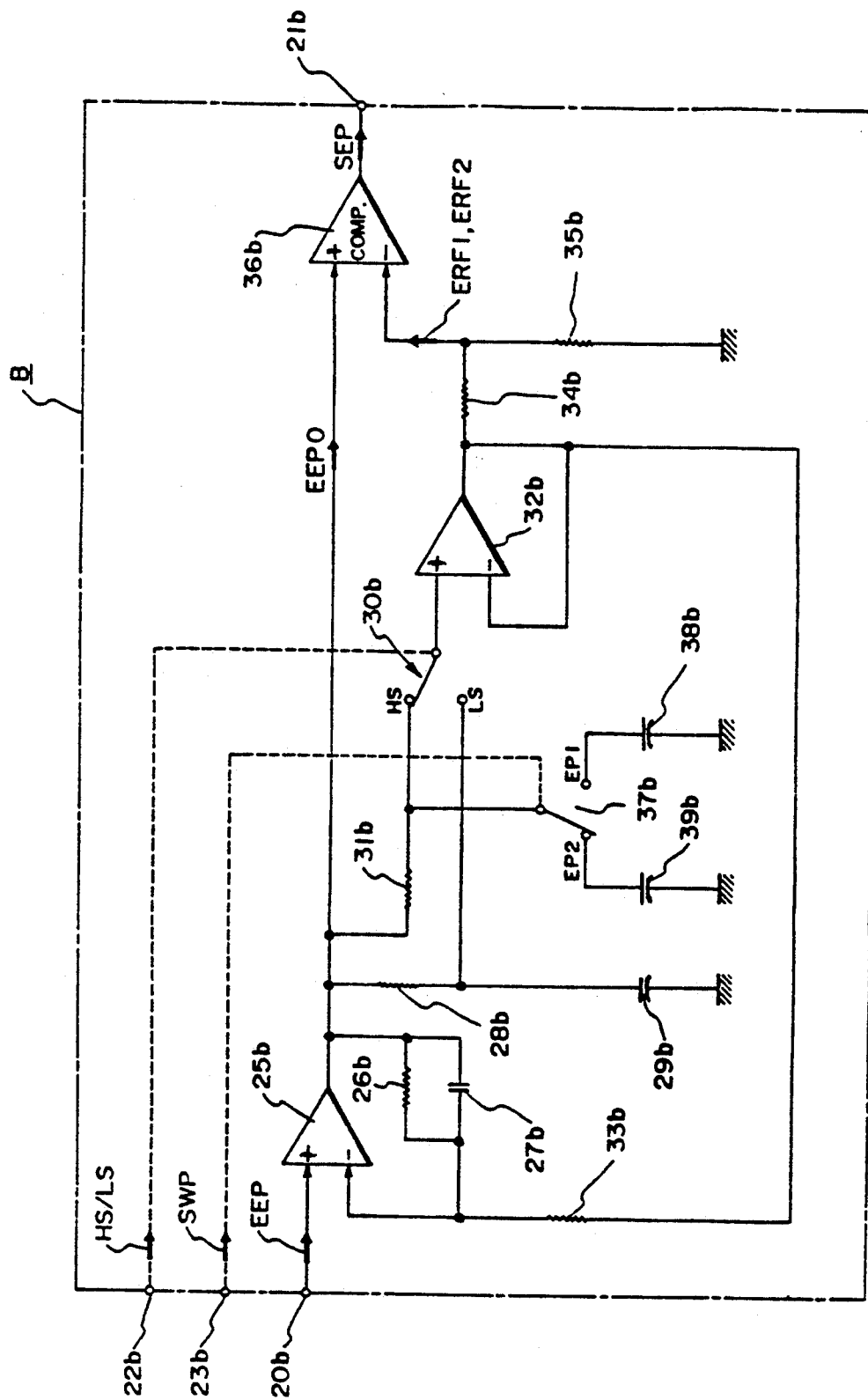

FIG. 3A
(SWP)
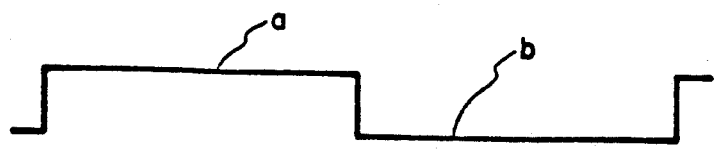
FIG. 3B
(EEP)
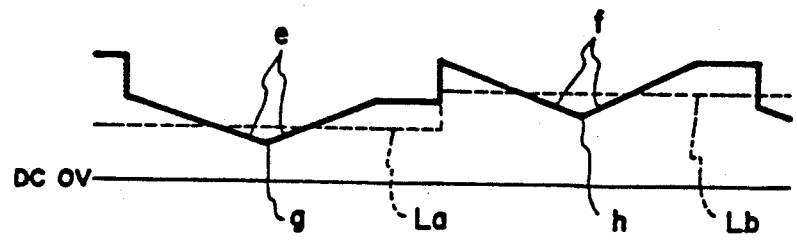
FIG. 3C
(EEPO)
FIG. 3D
(SEP)
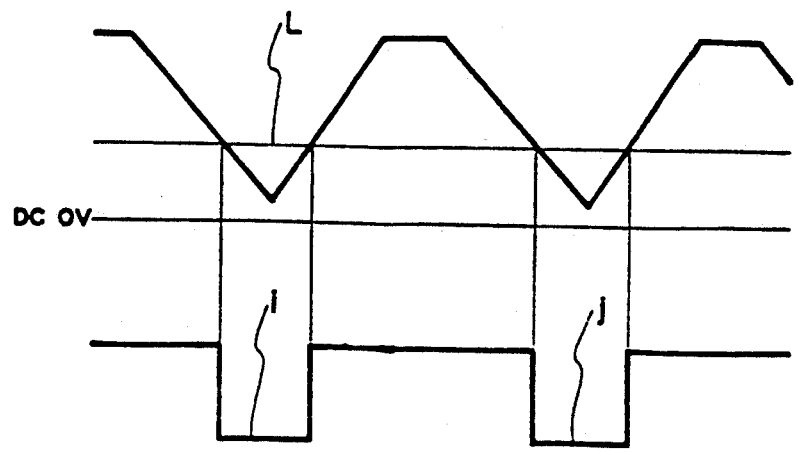

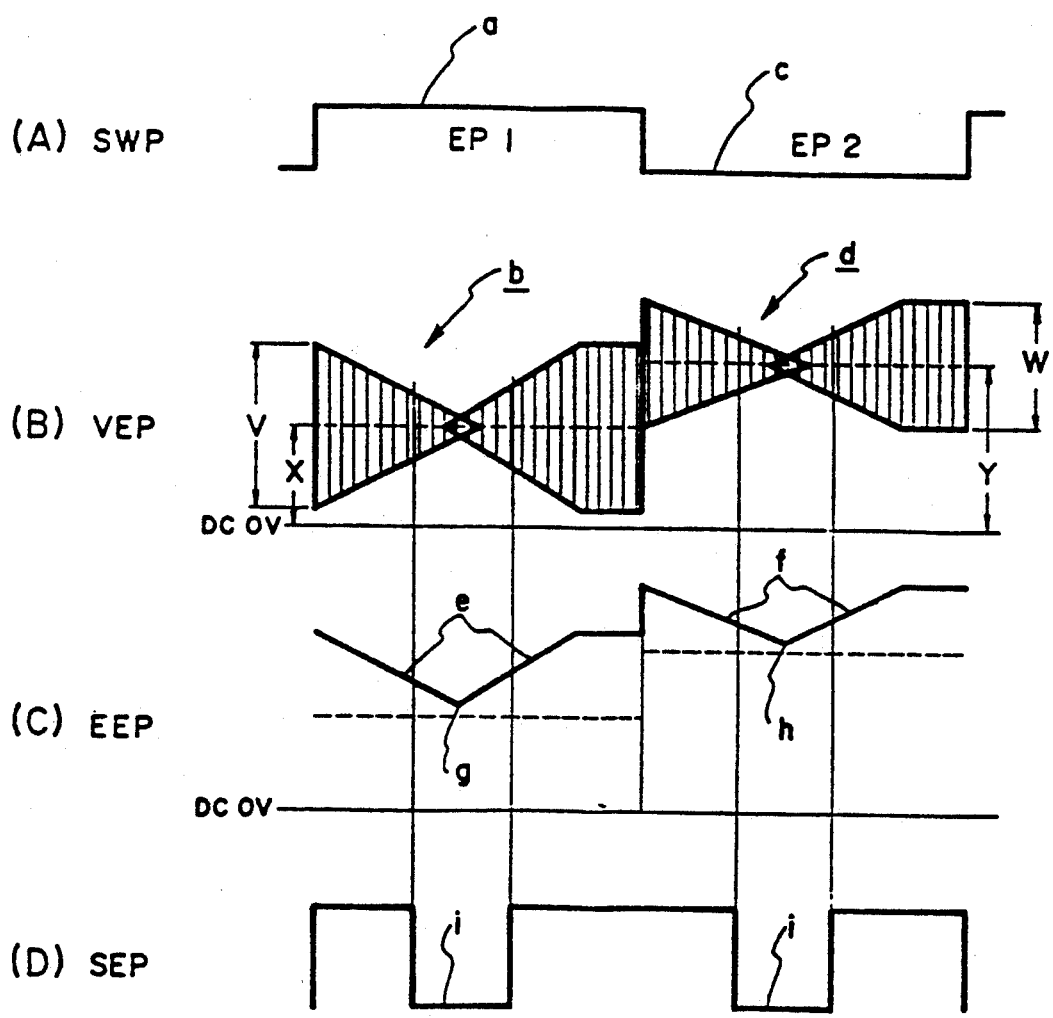

VARIABLE-SPEED REGENERATION COMPENSATING APPARATUS FOR DOUBLE AZIMUTH 4-HEAD TYPE VIDEO TAPE RECORDER

FIELD OF THE INVENTION

The present invention relates to a variable-speed regeneration compensating apparatus for a video tape recorder in which compensations are carried out by inserting the regenerating picture information of a low speed recording/regenerating head in place of stripe shaped or strip shaped optical noises. More particularly the invention relates to a variable-speed regeneration compensating apparatus for a double azimuth 4-head type video tape recorder in which the regenerating picture data simultaneously regenerated by a standard speed recording/regenerating head disposed adjacently to the low speed recording/regenerating head are inserted in place of stripe shaped or optical noises caused by partial degradation of the regenerating picture data or cross talk, thereby realizing the compensations.

The present invention applies to the case where recorded picture data is regenerated at a speed different from the recording speed (variable-speed regeneration), and also applies to the case where picture data recorded using a standard speed recording/regenerating head (two pairs of low speed and standard speed heads) is regenerated using the standard speed recording/regenerating head. In such a case, the picture data which is simultaneously regenerated by the low speed recording/regenerating head is inserted in place of the stripe shaped or optical noises caused by the partial defects of the regenerating picture data or by cross talk.

The standard speed head belongs to a double azimuth 4-head type revolving drum. Particularly, the present invention is applied to the case where the variable speed regeneration compensating apparatus is improved such that a recording medium is not moved in a standard speed relatively to the head, but is moved more slowly than the head, thereby making it possible to continue the recording task for a long time.

The present invention applies not only to the above case, but also to the case where picture data which is recorded at a low speed by means of a low speed recording/regenerating head is subjected to a variable speed regeneration using a low speed recording/regenerating head. In such a case, the stripe shaped or optical noises which are caused by the partial degradation of the regenerating picture information or by cross talk are replaced with the regenerating picture data which are simultaneously regenerated by the standard recording/regenerating head disposed adjacently to the low speed recording/regenerating head, thereby realizing the compensations.

BACKGROUND OF THE INVENTION

A double azimuth 4-head type video tape recorder is well known in the field.

That is, a revolving drum faces a running recording medium, i.e., a video tape, at an inclined angle. This drum includes a pair of standard speed recording/regenerating heads which are oppositely disposed and separated by 180 degrees. In addition, the drum includes, on the outer circumferential surface thereof, a pair of low speed recording/regenerating heads which are separated by 180 degrees, and also separated by a small distance (about 2 minutes horizontal scanning distance) from the above mentioned standard heads. In total, 4 heads consisting of two pairs of standard speed and low speed recording/regenerating heads forming two sets respectively are installed separated by 180 degrees on the drum.

Of the pair of the standard speed recording/regenerating heads, one of them has +6 degrees azimuth (VHS method) or +7 degrees azimuth (B method) (the azimuth indicating the angle between the head running direction and the lengthwise direction of the magnetic cap of the head). Against this angle, the other head forms an azimuth of −6 degrees or −7 degrees. Thus there is seen a difference between the two azimuths adjacent to each recorded video track for forming a picture by means of the traces of the relative motions between the video tape and the heads.

That is, a video track is recorded in an azimuth of +6 degrees or +7 degrees by one of the heads, and the adjacent video track is recorded in an azimuth of −6 degrees or −7 degrees by the other head. Thus, during a regenerating operation of a single track, although a head partially faces adjacent tracks cross talk arising therefrom can be effectively inhibited. This is a known technique (NHK home video technique, Japanese Broadcasting Association Item 87).

The pair of the low speed heads are disposed on the circumferential surface of the drum and mutually separated by 180 degrees. One of them is disposed adjacent to one of the standard speed heads having an azimuth of +6 degrees or +7 degrees has an azimuth of −6 degrees or −7 degrees. The other low speed head is disposed adjacent to the other standard speed head having an azimuth of −6 degrees or −7 degrees has an azimuth of +6 degrees or +7 degrees.

Therefore, a variable speed regeneration can be carried out using the standard speed head thereby assuring low speed regeneration or a high speed regeneration of a video track of a video tape recorded in a standard speed (this will be called standard speed recorded medium). This is achieved by using the pair of the standard speed heads. In a variable speed regeneration operation, the recorded video track and the head scanning track do not correspond to each other, and therefore, the adjacent video track is included during the regeneration scanning.

Therefore, the low speed head of a narrow width (19f) (VHS method), facing a video track having a wide width (58f) (VHS method) and recorded by a standard speed head, can partially regenerate a wide width video track which is recorded with the corresponding azimuth inclination angle. This regeneratable portion almost corresponds to the portion which is impossible to regenerate by means of the standard speed head. Therefore, when a video tape which is recorded in the standard speed is to be regenerated, the picture data which corresponds to the unregeneratable portion during a variable speed regeneration is replaced with the regeneration picture data obtained from a low speed head which is simultaneously operating.

Thus the required compensation is achieved with this well known technique. (Television technology, electronic technology publication, volume of April, 1989, Items 54–58).

Assuming such a double azimuth 4-head type, and assuming the possibility of recording/regeneration by the two pairs of the heads, in the case where the recorded data is subjected to a variable speed regeneration using the pair of the standard speed heads, the stripe shaped or strip shaped optical noise can be replaced with a substitution picture data. This conventional method is illustrated in FIG. 6.

Referring to FIG. 6, a pair of standard speed regenerating heads SP1,SP2 are connected through a pair of separate pre-amplifiers 1,2 to an enlarged region analogue switching circuit 3 which is commonly used as a shifting means for the standard speed regenerating head. In the same way, a pair of low speed regenerating heads EP1,EP2 are connected through a pair of pre-amplifiers 4,5 to an enlarged region analogue switching circuit 6 which is well known and commonly used as a switching means for the low speed regenerating head, with this switching circuit 6 being operated so as to complement the switching circuit 3.

In addition to the illustrated components, the analogue switching circuits 3,6 receive regenerating head switching pulses SWP and compensating pulses SWP in a separately expressed order, so that the two switching circuits 3,6 should be able to perform compensatory switching operations. In relation with this, an example for the regenerating head switching pulses SWP is taken. That is, a state of "0" is maintained for the angular interval of 180 degrees where a first standard speed regenerating head SP1 and a second low speed regenerating head EP2 are facing to the video tape which performs relative motions.

As against this, the analogue switching circuit 3 switches the first standard speed regenerating head SP1 to the standard speed regenerating signal VSP1 through the pre-amplifier 1 in order to output a standard speed regenerating signal VSP. Meanwhile, the compensation regenerating head switching pulse SWP which is inverted by an inverter (not shown) is maintained in a state of "1", while, in response to this, the analogue switching circuit 6 switches a low speed regenerating signal VEP2 for the second low speed regenerating head EP2 so that a low speed regenerating signal VEP to be outputted.

Successively to the above operation, an inverse relation is established such that the regenerating head switching pulse SWP is in a state of "1", and the compensation regenerating head switching pulse SWP is in a state of "0", for the angular interval of 180 degrees of the drum in which the second standard speed regenerating head SP2 and the first low speed regenerating head EP1 are facing to the video tape which is performing relative motions. Consequently, the two analogue switching circuit 3,6 switches the standard speed regenerating signal VSP2 for the second standard speed regenerating head SP2 and the low speed regenerating signal VEP for the first low speed regenerating head EP1 in a separately expressed order before outputting them.

Thus the output terminals of the two analogue switching circuits 3,6 which switch the regenerating signals VSP,VEP are respectively connected to the input terminal of a next standard speed regenerating envelope detecting circuit 7 and to the input terminal of a low speed regenerating envelope detecting circuit 8 in a separately expressed order. Meanwhile, the output terminals of the two envelope detecting circuits 7,8 are connected to first and second input terminals of a comparator 9.

The output terminal of the comparator 9 is connected to operate an analogue switching circuit 10, while the switching circuit 10 is connected to a compensation regenerating signal output terminal 11 by selecting one of the output terminals of the analogue switching circuit 3 and the analogue switching circuit 6 in response to the regeneration signal switching pulse SSP of the comparator 9. Thus the switching circuit 10 forms a means for switching the regeneration signal for the standard speed recorded medium.

Now will be considered the case where picture data of a standard recording using the standard recording heads SP1,SP2 is subjected to a variable speed regeneration at triple speed using the low speed regenerating heads EP1,EP2. The operation of the conventional apparatus will be described referring to FIGS. 7A and 7B. FIG. 7A illustrates an overlapping of the scanning traces of the video head with the video tracks for the recording time during a triple speed regeneration, i.e., the scanning traces of the video head obtained by observing the relative motions of the video head from the non-magnetic face of the video tape. FIG. 7B illustrates the wave pattern of the conventional apparatus in time series.

Where video tracks a,b,c recorded by standard recording heads are subjected to a variable speed regeneration of a triple speed as shown in FIG. 7A, video head scanning traces d,e are formed by the standard speed regenerating head during the variable speed regeneration. Here, a video head scanning trace e is is produced by the second standard speed regenerating head SP2, while another video head scanning trace e' shown in dotted lines and having a narrow width is produced by the first regenerating head EP1.

The mutual positional relationship between the video head scanning traces e,e' is governed by the standard speed of the known double azimuth 4-head type paired heads, and by the widths and position heights of the low speed regenerating video heads (i.e., the heads SP2,EP1). During the recording, the axial inclinations of the scanning traces e,e' are steeper by about 3 times that of the axial inclinations of the standard speed video tracks a,b,c. The reason is that, in the variable speed regeneration of a triple speed, the regeneration is carried out at a speed 3 times the standard recording speed. The above principle is validly applied also to video head scanning traces d,d' which are succeeded in time series.

However, during the time when the second standard speed regenerating head SP2 and the first low speed regenerating head EP1 are moved in a fixed relation in accordance with the scanning traces e,e' of the two video heads which precede in time series, the regeneration head switching pulse SWP lies in a state of "1", and the compensating pulse for it lies in a state of "0" as already described [FIG. 7B (A)f]. In response to this, the analogue switching circuits 3,6 switch the regenerating signals VSP2,VSP1 of the second standard speed regenerating head SP2 and the first low speed regenerating head EP1, before outputting them.

The detail of the video head scanning trace e produced by the second standard speed regenerating head SP2 will be described for the case where the regeneration head switching pulse SWP is restored to a period of state "1" [FIG. 7B(A)f] and a variable speed regeneration is carried out in this period. The initial period of the relative motion between the tape and head forms a wedge shaped region XSP2 having a narrowing tail. As against this wedge shaped region, a gradually reducing regenerating signal VSP2 [FIG. 7B (B)h] is produced by the second regenerating head SP2.

A lozenge region YEP1 following the wedge shaped region XSP2 has an azimuth which does not correspond with that of the second standard speed regenerating head SP2, and, therefore, the regenerating signal VSP2 disappears [FIG. 7B(B)i]. Instead, the azimuth of the first low speed regenerating head EP1 which is moving simultaneously comes to be corresponded with the lozenge region YEP1, and, therefore, it gradually increases correspondingly with the lozenge region to stay at a certain value, while the lozenge shaped regenerating signal VEP1 [FIG. 7B(C)j] is regenerated by the first low speed regenerating head EP1.

Further, as against a wedge shaped region ZSP2 which has a thick tail, and which succeeds the lozenge region YEP1, the second standard speed regenerating head SP2 produces a regenerating signal VSP2 [FIG. 7B(B)k] which gradually increases correspondingly with the wedge shape having a thick tail. During the interval where the regeneration head switching pulse SWP stays in a state of "0" all in the same way, the first standard speed regenerating head SP1 and the second low speed regenerating head EP2 which are switched perform relative motions in accordance with the video head scanning traces d,d' succeeding in time series.

First, as against a wedge shaped region XSP1 having a thin tail, a gradually decreasing regenerating signal VSP1 [FIG. 7B(B)i] is regenerated by the first standard speed regenerating head SP1, and then, as against the lozenge shaped region YEP2, a lozenge shaped regenerating signal VEP2 [FIG. 7B(C)m] is regenerated by the second low speed regenerating head EP2. Then, as against the wedge shaped region ZSP1 having a thick tail, a gradually increasing regenerating signal [FIG. 7B(B)n] is regenerated by the first standard speed regenerating head SP1.

Thus, during the period when the regeneration head switching pulse SWP is in a state of "1", the regenerating signals VSP2 which are regenerated by the second standard speed regenerating head SP2 are supplied through the above described analogue switching circuit 3 to the standard speed regeneration envelope detecting circuit 7 in the form of standard speed regenerating signals VSP. Then the circuit 7 outputs standard speed regeneration envelope signals ESP which expresses the envelope of the regenerating signals VSP detected as above.

The regenerating signals VEP1 which are regenerated by the first low speed regenerating head EP1 are supplied through the above described analogue switching circuit 6 to the low speed regeneration envelope detecting circuit 8 in the form of low speed regenerating signals VEP. The circuit 8 outputs low speed regeneration envelope signals EEP expressing the envelopes of the regenerating signals VEP detected as above.

Then the succeeding comparator 9 receives the standard speed regeneration envelope signals ESP and the low speed regeneration signals EEP through the first and second input terminals, respectively, and then, compares the magnitudes of the two sets of the signals. Under this condition, during the period in which the regeneration head switching pulses SWP is in a state of "1", the gradually decreasing regeneration video signals VSP of the second standard speed regenerating head SP2 and the gradually increasing regeneration signals VEP1 of the first low speed regenerating head EP1 cross each other.

Then at the time point where the two values become equal each other [FIG. 7B(C)o], the relation of the magnitudes of the two regenerating envelope signals ESP,EEP are inverted, with the result that the regenerating envelope signals EEP become larger than the regenerating envelope signals ESP. Consequently, the regeneration signal switching pulse SSP which is for the standard speed recorded medium and which is outputted by the comparator 9 is shifted to a state of "1", and, in response to this, the analogue switching circuit 10 is switched over In other words, the selected ones are inserted into the second standard speed regenerating video signals VSP2 [FIG. 7B(D)p], and then, the mixed signals are supplied to the compensated regenerating signal output terminal 11 in the form of compensated regenerating signals VSSP for the standard speed recorded medium.

During the period in which the succeeding regeneration head switching pulse SWP is in a state of "0", the second low speed regenerating signals VEP2 having greater envelopes are inserted into the first standard speed regenerating signals VSP1 [FIG. 7B(D)q] based on the same operation as described above, and then, the mixed signals are supplied to the output terminal 11 in the form of compensated regenerating signals VSSP for the standard speed recorded medium.

However, in the case where a picture data which is completely recorded by means of a low speed recording head is taken as the object of the concern, the compensating operations for continuous regenerations bring various undesirable results. Such undesirable phenomena will be described referring to FIG. 8A (which is equivalent to FIG. 7A), FIG. 8B (which is equivalent to FIG. 7B) and FIG. 9, which precisely enlarges the recess of the wave pattern.

Now it is assumed that the video tracks a,b,c, ... i,j,k which have narrow widths and are recorded by low speed recording heads are continuously regenerated at a triple speed. Then, during the variable speed regeneration, video head scanning traces l,m having wide widths are formed by standard speed regenerating heads. Further, these wide video head scanning traces l,m, include video head scanning traces l', m' having narrow widths and formed by the low speed regenerating heads which are operated simultaneously with the standard speed regenerating heads during the variable speed regeneration.

First, in response to the regeneration head switching pulse SWP [FIG. 8B(A)n] which is in a state of "1", the first low speed regenerating head EP1 which is performing a variable speed regeneration of a triple speed makes relative motions along the video head scanning trace m' which precedes in time series. As against the wedge shaped region QEP1 having a narrow end and appearing in the initial stage of the relative motions, the first low speed regenerating head EP1 regenerates regenerating signals VEP1 [FIG. 8B(B)o] having a gradually decreasing trend in correspondence with the wedge shaped region having a narrow end.

Following the wedge shaped region QEP1, the azimuth of a lozenge shaped region RSP2 does not correspond with that of the first low speed regenerating head EP1, and therefore, the regenerating signals VEP1 disappear [FIG. 8B(B)p]. In the meantime, there occurs an overlapping with the leading end portion of the wedge shaped region QEP1 having a narrow end, and therefore, there is regenerated a regenerating signal VEP1 [FIG. 8B(B)q] having a gradually increasing trend in correspondence with a wedge shaped region having a wide end.

In the meantime, the second regenerating head SP2 which performs relative motions along the video head scanning trace m regenerates strip shaped regions [(RSP2)+(R'SP2)] which have leading end portions divided from the narrow ended wedge shaped region TSP2 by the video head scanning trace m as an inclined boundary.

Further, in correspondence with a wide ended wedge shaped region USP2, the second regenerating head SP2 further regenerates another signal [FIG. 8B(C)r] having a substantially flat form, while, in correspondence with the inclined cut portion of the region R'SP2, the head SP2 regenerates a gradually decreasing regenerating signal VSP2 [FIG. 8B(C)s]. In the above cases, the azimuths of the regions QEP1,SEP1 do not correspond with that of the second standard speed regenerating head SP2, and therefore, the regenerating signal VSP2 is not implicated here.

Then, if the head switching pulse SWP is shifted to a state of "0⇌", then, in response to this, the first standard speed regenerating head SP1 and the second low speed regenerating head EP2 start the operations of a variable speed regeneration of a triple speed. Then they perform relative motions along the wide width video head scanning trace 1 which succeeds in time series. Thus, as against the regions PSP1, WEP2,XSP1, YEP2, ZSP1, the first standard speed regenerating head SP1 and the second low speed regenerating head EP2 respectively regenerate two regenerating signals VSP1,VSP2 [FIG. 8B(B)t, FIG. 8B(C)u] which increase and decrease in the same form as when the head switching pulse SWP is in a state of "1".

Thus, in the case where a picture data which is recorded in a low speed by the low speed recording heads EP1,EP2 is to be subjected to a variable speed regeneration, it is very difficult to form compensated regenerating signals simply by comparing the magnitudes of the envelopes of the regenerating signals VEP,VSP, as is apparent by the increasing/decreasing trends of the regenerating signals VEP,VSP as shown in FIGS. 8B and 8C. This is the principal difference from the case where a picture data which is recorded at a standard speed by means of the standard speed recording heads SP1,SP2 is subjected to a variable speed regeneration.

Further, in the case where a picture data which has been recorded at a low speed by means of the low speed recording heads is subjected to a variable speed regeneration, the low speed regenerating heads EP1,EP2 have to be justly used to obtain regenerating signals VEP, if a proper picture data is to be obtained. Therefore, its use usually should be confined to the case where the signals are damped by the regenerating signals VEP to such an extent that partial degradation of the picture data or cross talk occur.

Therefore, it is more desirable in terms of the picture quality to use the regenerating signals VSP which are regenerated by the standard speed regenerating heads SP1,SP2. However, the current regenerating signals VEP are very low in their signal level compared with the regenerating signals VSP which are regenerated by the standard speed regenerating heads SP1,SP2. Therefore, there exist differences in the envelopes of the regenerating signals VEP1, VEP2 regenerated by the first and second low speed regenerating heads EP1, EP2, while there exist also step differences between the levels of the wave centers of the two regenerating signals VEP1, VEP2.

Consequently, due to the current regenerating signals VEP regenerated by the first and second low speed regenerating heads EP1, EP2 and due to their envelopes, there are many difficulties in properly deciding the time of selecting the regenerating signals VSP which are regenerated by the first and second standard regenerating heads SP1, SP2.

FIG. 9 illustrates the wave patterns showing mainly the time relation between the regeneration signal switching pulses SEP for the low speed recorded medium, which are used in deciding the time of selecting the regenerating signals VEP1, VEP2 of the first and second low speed regenerating heads EP1, EP2 and the regenerating signals VSP1, VSP2 of the first and second standard speed regenerating heads SP1, SP2. The above described difficulties will be described in further detail referring to FIG. 9.

In this drawing, during the period when the regeneration head switching pulse SWP is in a state of "1", and when the first low speed regenerating head EP1 is performing a variable speed regeneration at triple speed [FIG. 9(A)a], the regenerating head EP1 obtains a regenerating signal VEP1 through the pre-amplifier 4, and this regenerating signal VEP1 has an amplitude-modulated wave pattern [FIG. 9(B)b] which is equivalent to the main body of the envelope of one side as shown in FIG. 8B schematically and extractively.

Meanwhile, during the time when the regenerating head switching speed regenerating head EP2 is performing continuously a variable speed regeneration at triple speed [FIG. 9(A)c], this time, the switched second low speed regenerating head EP2 obtains another amplitude-modulated wave pattern [FIG. 9(B)d] through the pre-amplifier 5, with this wave pattern succeeding the wave pattern of the first low speed regenerating head EP1.

Now a comparison will be made on the separate amplitude-modulated wave patterns [FIG. 9(B)b, FIG. 9(B)d] of the first and second low speed regenerating heads EP1, EP2. Generally speaking, the wave pattern (amplitude) [FIG. 9(B)V] of the first low speed regenerating head EP1 and the wave pattern [FIG. 9(B)W] of the second low speed regenerating head EP2 do not correspond each other, and particularly, the center position of the wave pattern [FIG. 9(B)X] of the former and the center position of the wave pattern [FIG. 9(B)Y] of the latter do not correspond.

FIG. 9C illustrates a state which is formed by extracting the envelopes of the regenerating signals VEP of the low speed regenerating heads EP1, EP2, after taking into account the above described non-correspondences. According to the wave pattern of this drawing, during the first half period as a state of "1" and during the second half period as a state of "0", the shape of the envelope, particularly the rising and falling slopes [FIGS. 9(C)e and 9(C)f] and the position of the envelope, particularly its minimum value [FIGS. 9(C)g and 9(C)h] exist in different forms. Because of these different existences, difficulties are encountered in the following period.

That is, this refers to a period in which the case is different from that of the regenerating signals VSP of the first and second standard regenerating heads SP1,SP2, and in which the case of the regenerating signals VEP of the first and second low speed regenerating heads shows a significant relative damping in the envelopes of the regenerating signals VEP of the low speed regenerating heads EP1,EP2.

In other words, this refers to the period in which the relative damping is significantly seen in the envelopes EEP of the regenerating signals VEP as shown in FIG. 9D, i.e., in the regeneration signal switching pulse (corresponding to SSP of FIG. 6) required for deciding the period for compensating the cross talks and degradations of the regenerating picture data by inserting the regenerating signals VSP of the simultaneously operating standard speed regenerating heads SP1,SP2.

That is, during this period, it is very difficult to form the regeneration signal switching pulse SEP for a low speed recorded medium by inverting to a state of "0" [FIG. 9(D)i]. Therefore, in the case where a variable speed regeneration is carried out using the low speed regenerating heads EP1,EP2 and using the low speed recorded medium, the stripe shaped or optical noises which appear on the regenerated picture can not be eliminated.

SUMMARY OF THE INVENTION

Therefore it is the object of the present invention to provide a variable speed regeneration compensating apparatus for a double azimuth 4-head type video tape recorder in which stripe shaped and optical noises appearing on the regenerated picture can be eliminated.

That is, when carrying out a variable speed regeneration on a low speed recorded medium by using a low speed regenerating head, variable speed regeneration compensation is achieved by inserting substitute picture data in place of the stripe shaped or optical noises appearing in the regenerated picture. Two time constant circuits are provided as a measure against the difficulties which are encountered in removing the stripe shaped and strip shaped optical noises in the conventional technique. Further, first and second low speed regenerating heads output two sets of low speed regenerating signals in a serial time series, and these two low speed regenerating signals are supplied after separately switching them over in such a manner as to be matched with the respective time constant circuits. The two time constant circuits respectively represent the envelope shapes and the center position of the wave pattern of the envelopes of two low speed regenerating signals. Voltage values obtained by carrying out integrations based on the envelopes of the two signals are formed and stored, and the two low speed regenerating signals are separately compared with reference signals formed by the integrated voltage values, thereby solving the above described noise problem. Meanwhile, in the case where a variable speed regeneration is carried out on a low speed recorded medium by using a low speed regenerating head, the stripe shaped or optical noises can also be eliminated, thereby forming a superior variable speed regeneration compensating apparatus for a double azimuth 4-head type video tape recorder.

In achieving the above object, the compensating apparatus according to the present invention is constituted as follows.

When a variable speed regeneration is carried out on a low speed recorded medium by using low speed regenerating heads EP1,EP2, a variable speed regeneration compensating circuit B for low speed recorded media, which is added to the conventional apparatus of FIG. 6, is switched over by a variable speed regeneration compensation circuit switch C, so that the switching operation of an analogue switch 10 as a means for switching the low speed recorded medium regenerating signals should be controlled. The variable speed regeneration compensating circuit B receives first and second low speed regeneration envelope signals EEP1,EEP2 of a low speed regeneration envelope detecting circuit 8.

In this case, as shown in FIG. 2, in response to a regenerating head switching pulse SWP and governed by a time constant circuit switching means 37b for carrying out switching operations, the compensating circuit B supplies the signals EEP1,EEP2 alternately to first and second time constant circuits. The first time constant circuit consists of a resistor 31b and a capacitor 38b, and the second time constant circuit consists of a resistor 31b and a capacitor 39b. The first and second time constant circuits alternately memorize first and second integrated voltage values, and, during the alternate memorizing of the integrated voltage values, the memorized values are alternately outputted governed by the switching operations of the switch 37b.

Based on first and second reference signals ERF-1,ERF2 which are formed by the first and second integrated voltage values, responses are made to the first and second reference signals and to first and second low speed regeneration envelope signals. A low speed recorded medium regeneration switching pulse forming means 36b outputs a low speed recorded medium regeneration signal switching pulse SEP, when the latter is smaller than the former.

Further, in response to the pulse SEP, the low speed recorded medium regeneration signal switch 10 switches the two speed regenerating signals VEP to a standard speed regenerating signals VSP, and outputs them in the form of low speed recorded medium compensating signals VSEP. Thus, when a picture data which has completed recordings at a low speed is subjected to a variable speed regeneration by means of low speed regenerating heads EP1,EP2, the regenerated picture data which is simultaneously produced by the standard speed regenerating heads is inserted in place of the stripe shaped and optical noises which are caused by cross talk and partial degradations of the regenerated data, thereby achieving compensations.

BRIEF DESCRIPTION OF THE DRAWINGS

The above object and other advantages of the present invention will become more apparent by describing in detail the preferred embodiment of the present invention with reference to the attached drawings in which:

FIG. 2 is a circuit diagram of a part of a low speed recorded medium variable speed regeneration compensating circuit B of FIG. 1;

FIG. 3A is a waveform illustration of the head switching pulse.

FIG. 3B is a waveform illustration of the low speed regeneration envelope signal.

FIG. 3C is a waveform illustration of the regeneration signal switching pulse.

FIG. 3D is a waveform illustration of the low speed regeneration signal switching pulse.

FIG. 9 illustrates in detail the recesses of the wave patterns of FIG. 8B.

DESCRIPTION OF THE PREFERRED EMBODIMENT

The preferred embodiment of the present invention will be described in detail with reference to FIGS. 1 to 5.

Figure 1:
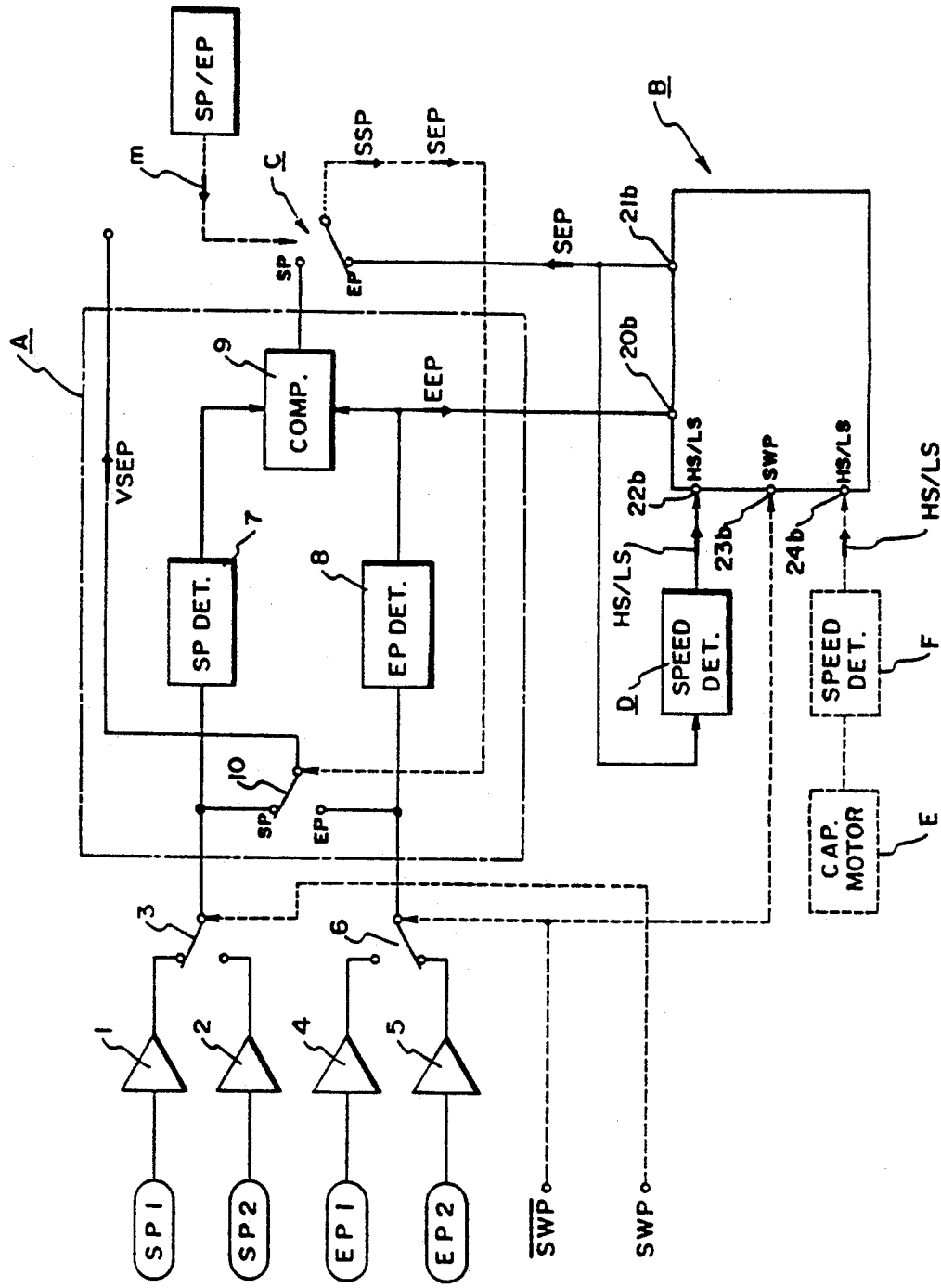
FIG. 1 is a block diagram showing the constitution of the apparatus according to the present invention.

Referring to FIG. 1, an output terminal of a low speed regeneration envelope detecting circuit 8 is connected to a low speed regeneration envelope input terminal 20b of a low speed recorded medium variable-speed regeneration compensating circuit B. An output terminal of a comparator 9 is connected to a first fixed contact of a shifting switch C for the variable speed regeneration compensating circuit, and which is externally operated. A second fixed contact of the switch C is connected to a low speed recorded medium variable-speed regeneration signal switching pulse output terminal 21b of the variable speed regeneration compensating circuit B. A movable contact of the switch C is operated in accordance with an analogue switching circuit 10.

The switching pulse output terminal 21b of the variable speed regeneration compensating circuit B is connected through a regeneration speed detecting circuit D to a regeneration speed signal input terminal 22b. A regeneration head switching pulse input terminal 23b of the compensating circuit B receives regeneration head switching pulses SWP.

Figure 6:
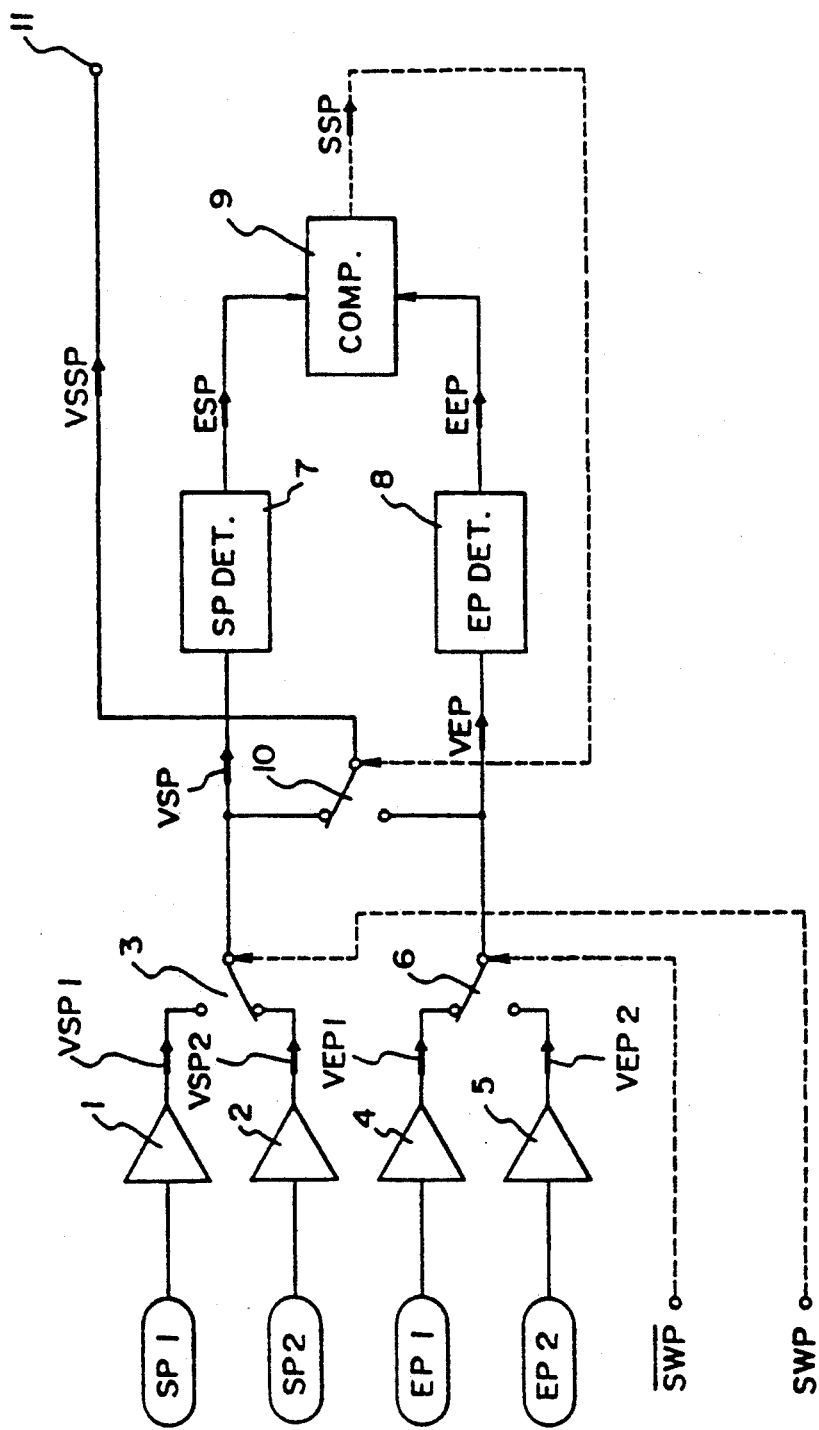
FIG. 6 is a block diagram showing the constitution of the conventional apparatus.

In FIG. 1, the same components an shown in FIG. 6 have the same reference symbols and the apparatus as shown in FIG. 1 also comprises an analogue switching circuit 10 used as a standard speed recorded medium regeneration signal switch and also as a low speed recorded medium regeneration signal switch, standard speed and low speed regeneration envelope detecting circuits 7,8, and a comparator 9 serving as an envelope comparator provided with a standard speed recorded medium variable-speed regeneration compensating circuit A.

FIG. 2 illustrates the internal circuit arrangement of the low speed recorded medium variable-speed regeneration compensating circuit B. The low speed regeneration envelope input terminal 20b is connected to a non-inverting input terminal of an arithmetic amplifier 25b, and the output terminal of this amplifier 25b is fed back through a parallel-connected resistor 26b and capacitor 27b to an inverting input terminal of the amplifier 25b, thereby providing feed-back.

On the other hand, the output terminal of the amplifier 25b is grounded through a serially connected resistor 28b and capacitor 29b. A non-contacting end of the capacitor 29b is connected to a first input terminal of an analogue switching circuit 30b which is a regeneration speed switch. A second input terminal of the switching circuit 30b is connected through a resistor 31b to the output terminal of the arithmetic amplifier 25b, while the output terminal of the switching circuit 30b is connected to a non-inverting input terminal of a subsequent arithmetic amplifier 32b.

Meanwhile, the analogue switching circuit 30b performs switching operations in accordance with regeneration speed signals HS/LS of the regeneration speed signal input terminal 22b.

The output terminal of the arithmetic amplifier 32b is fed back to its own inverting input terminal so as to form a voltage follower, and the output terminal is also fed back through a resistor 33b to the inverting input terminal.

The output terminal of the arithmetic amplifier 32b is grounded through two resistors 34b,35b serially connected to form a voltage divider. The output contact of this voltage divider is connected to an inverting input terminal of a comparator 36b which serves as a generator for the low speed recorded medium regeneration signal switching pulse. A non-inverting input terminal of this comparator 36b is connected to the output terminal of the arithmetic amplifier 25b, and the output terminal of the comparator 36b is connected to the low speed recorded medium regeneration signal switching pulse output terminal 21b of the variable-speed regeneration compensating circuit B.

Meanwhile, the intermediate portion between the resistor 31b and the second input terminal of the analogue switching circuit 30b is connected to the input terminal of an analogue switching circuit 37b which is a switch for a time constant circuit. First and second output terminals of the opposite sides of the switching circuit 37b are grounded through separate capacitors 38b,39b. The switching circuit 37b performs switching operations in accordance with the regeneration head switching pulses SWP of the regeneration head switching pulse input terminal 23b.

The two capacitors 38b,39b respectively form first and second time constant circuits in association with the resistor 31b which is alternately connected through the analogue switching circuit 37b.

In FIG. 1, the variable-speed regeneration compensating circuit B is provided with another regeneration speed signal input terminal 24b, and an imaginary line is drawn to show that regeneration speed signal HS/LS generated in accordance with the revolution rate of an interlocked capstan motor E can be supplied.

Figure 7A:
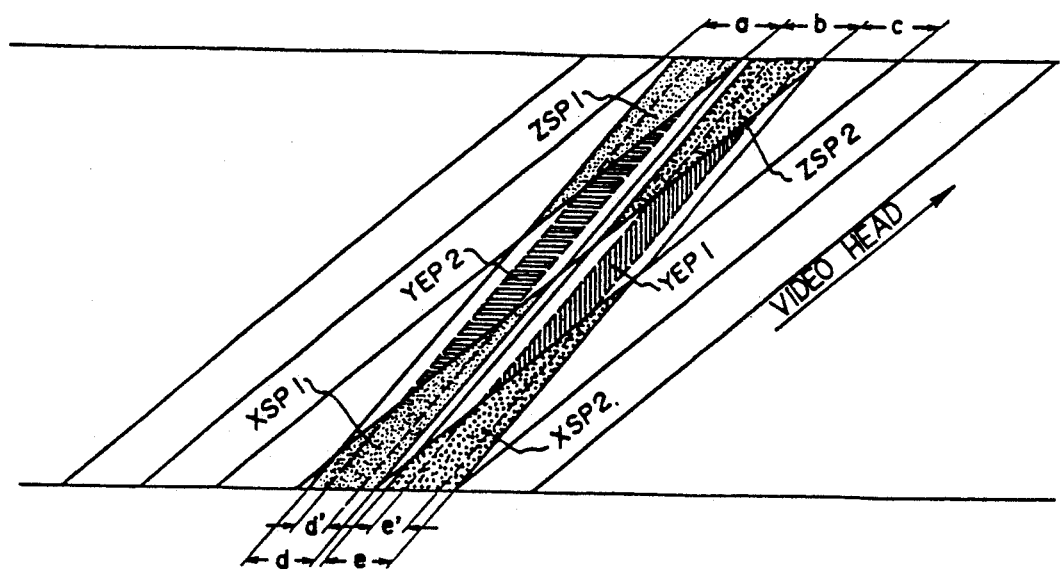
FIG. 7A is a graphical illustration of the traces of the motions of the head relative to the video tape as observed from the non-magnetic face of the tape, when a standard speed recorded medium is subjected to a variable speed regeneration of a triple speed by means of a standard speed regenerating head.
Figure 7B:
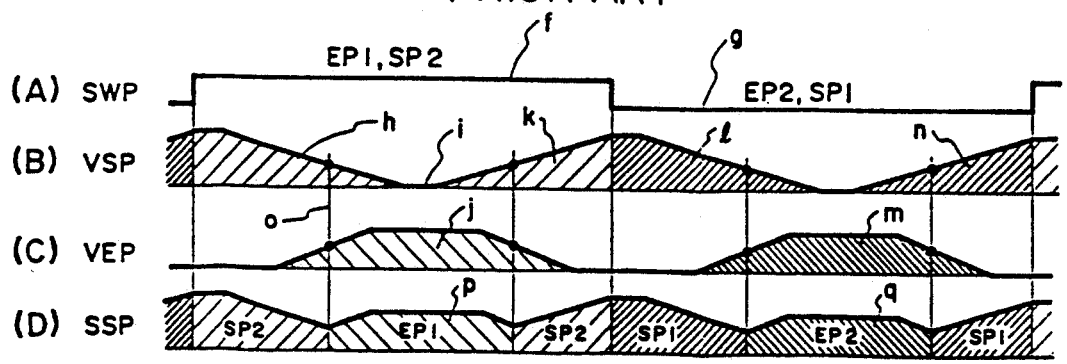
FIG. 7B is a timing chart graphically showing the recesses of the wave patterns corresponding to the traces of FIG. 7A.
Figure 8A:
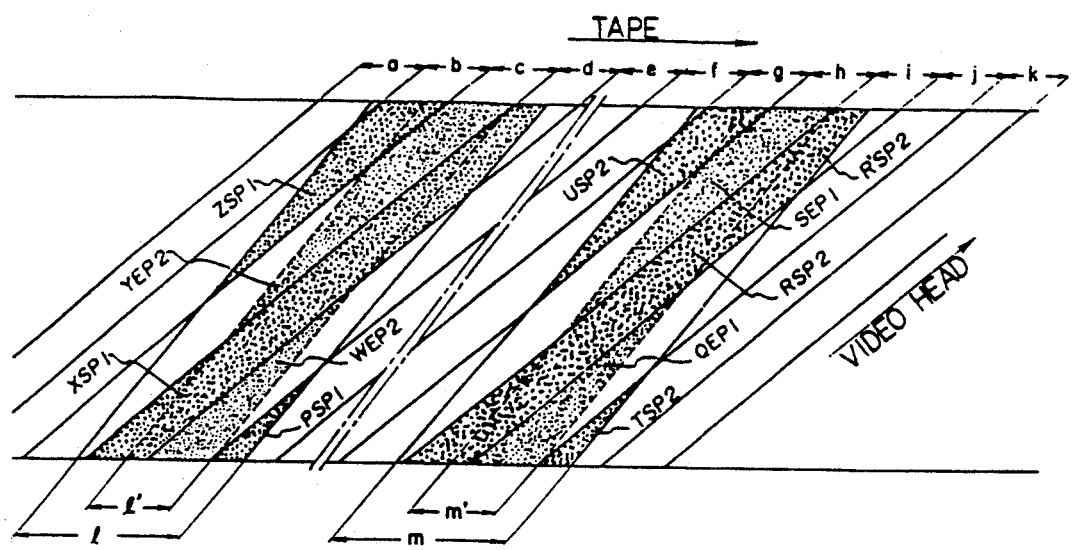
FIG. 8A is a graphical illustration of the traces of the motions of the head relative to the video tape as observed from the non-magnetic face of the tape, when a low speed recorded medium is subjected to a variable speed regeneration of a triple speed by means of a low speed regenerating head.
Figure 8B:
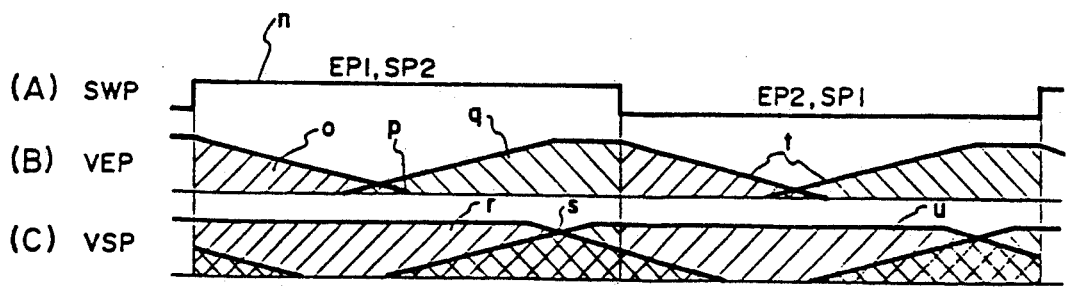
FIG. 8B is a timing chart graphically showing the recesses of the wave patterns corresponding to the traces of FIG. 8A.

In the present invention, during a variable-speed regeneration for a standard speed recorded medium, the movable contact of the shifting switch C, externally operated, is connected through the first fixed contact to the output terminal of the comparator 9. Therefore, the standard speed recorded medium variable-speed regeneration compensating circuit A in FIG. 1 can be properly operated during operations shown in FIGS. 7A and 7B.

On the other hand, during a variable speed regeneration of a low speed recorded medium, the movable contact of the shifting switch C is connected through the second fixed contact to the regeneration signal switching pulse output terminal 21b of the low speed recorded medium variable-speed regeneration compensating circuit B.

Now referring to FIGS. 2 and 3, the analogue switching circuit 10 which is a low speed recorded medium regeneration signal switch is explained in more detail in its operation in accordance with the low speed recorded medium regeneration signal switching pulses SEP of the compensating circuit B.

The low speed regeneration envelope signal input terminal 20b receives a low speed regeneration envelope signal EEP, and the wave pattern of the signal EEP is such that its wave contour and wave position are shifted as shown in FIG. 3B, in accordance with the alternative states a and b of "1" and "0" in FIG. 3A of the regeneration head switching pulses which are supplied by the regeneration head switching pulse input terminal 23b.

Further, during the time when the regeneration head switching pulse SWP is in a state a of "1" in FIG. 3A, a certain slope e in FIG. 3B and a certain minimum value g in FIG. 3B are exhibited. During the next period when the switching pulse SWP is shifted to a state of "0", a separate slope f in FIG. 3B and a separate minimum value h in FIG. 3B are exhibited.

Ultimately, for the former period, the average value of the envelope signal corresponds to the wave center of an amplitude-modulated wave pattern and is indicated by a dotted line La in FIG. 3B. On the other hand, for the latter period, the average value of the envelope signal is indicated by a dotted line Lb with the whole wave pattern corresponding to that of FIG. 9C.

The envelope signal EEP is supplied to the non-inverting input terminal of the arithmetic amplifier 25b. The amplifier 25b has the characteristic of low pass filter owing to the resistor 26b and the capacitor 27b. Thus, undesired high frequency noise contained in the envelope signals EEP is removed.

In the case where the regeneration speed signals HS/LS which are generated through the signal processing (to be described later) and are supplied to the regeneration speed signal input terminal 22b are in a state of "1", the output terminal of the analogue switching circuit 30b is electrically connected to the second input terminal in accordance with the state of "1". Consequently, the output signals of the arithmetic amplifier 25b, which are supplied through the resistor 31b, are supplied to the succeeding arithmetic amplifier 32b, with the resistor 28b and the capacitor 29b not being related to the operation. In this case, the output signals of the arithmetic amplifier 25b, which appear in the resistor 31b, are alternately supplied to the two capacitors 38b, 39b by the analogue switching circuit 37b which performs switching operations in accordance with the regeneration head switching pulse SWP supplied through the regeneration head switching pulse input terminal 23b.

That is, during the time when the regeneration head switching pulse SWP is in a state a of "1" in FIG. 3A, the output signals e.g. in FIG. 3B which correspond to the low speed regeneration envelope signal EEP of the arithmetic amplifier 25b are switched by the switching circuit 37b, and are supplied through the resistor 31b to the first capacitor 38b. The consequence is to charge the first capacitor 38b which constitutes the first time constant circuit in cooperation with the resistor 31b. Consequently, the charge on the capacitor 38b represents an integrated voltage which has a certain relation to the average value La in FIG. 3B of the envelope signal EEP during the period a in FIG. 3A.

During the time when the regeneration head switching pulse SWP is in a state b of "0" in FIG. 3A, the output signals f, h in FIG. 3B of the arithmetic amplifier 25b are switched by the switching circuit 37b, and are supplied through the resistor 31b to the second capacitor 39b. The consequence is to charge the second capacitor 39b which constitutes the second time constant circuit in cooperation with the resistor 31b. Consequently, the voltage of capacitor 39b is related to the average value Lb in FIG. 3B of the envelope signal EEP for the period b in FIG. 3A.

The continuation of the alternate memorizing of the integrated voltages corresponding to the regeneration envelope signals EEP is achieved by continuously supplying them and by alternately switching the first regeneration envelope signals EEP1 of the first low speed regenerating head EP1 always as against the first capacitor 38b of the first time constant circuit, and by switching the second regeneration envelope signals EEP2 of the second low speed regenerating head EP2 always as against the second capacitor 39b of the second time constant circuit. The respective integrated voltages memorized in the first and second condensers 38b, 39b are simultaneously switched by a single switching circuit 37b, and are alternately validated as the input signals to be inputted into the non-inverting input terminal of the succeeding arithmetic amplifier 32b.

The compensating operation for the variations of the average values (the variations of the wave patterns and the variations of the wave center due to the amplitude modulations) of the envelope signals encountered in alternately using the two capacitors 38b, 39b will be described referring to FIG. 4 which illustrates an extraction of a critical portion of FIG. 2. Particularly, FIG. 5 will be referred to, in which the wave patterns for the portions ⓐ to ⓕ of FIG. 4 are illustrated.

Figure 5:
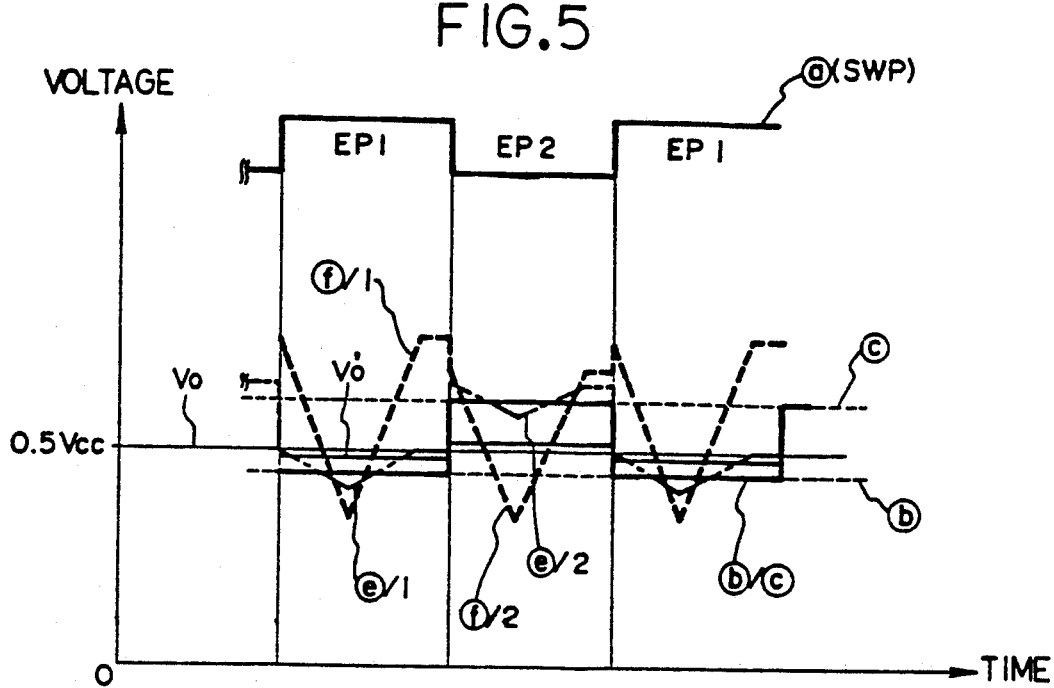
FIG. 5 illustrates wave forms of two stabilized integrated voltage values.

As described above, if the two capacitors 38b, 39b are continuously switched over by means of the switching circuit 37b, the voltages EC1,EC2 between the terminals of the capacitors 38b, 39b become an equilibrium state ⓑ and ⓒ in FIG. 5 in the form of two stabilized integrated voltage values which correspond to the separate average values La and Lb in FIG. 3B of the two envelope signals EEP1,EEP2 [FIGS. 3(B)e,g and 3(B)f,h] in accordance with the repetitions of charging and discharging operations.

However, under an ideal normal operation state in which the tiny fluctuations of the inputted low speed regeneration envelope signals EEP (ⓔ in FIGS. 4 and 5) are disregarded, the mutually isolated integrated voltage values ⓑ,ⓒ in FIG. 5 which are memorized in the two condensers 38b, 39b are switched over by the same analogue switching circuit 37b, and are supplied to the arithmetic amplifier 32b of the voltage follower where impedance conversions for are carried out. Consequently, the integrated voltage values are fed back to the inverting input terminal ⓓ in FIG. 4 of the arithmetic amplifier 25b, and therefore, the wave patterns here respond to the regeneration head switching pulses SWP (ⓐ in FIG. 5). In the interval between the two voltage values (ⓑ,ⓒ in FIG. 5) of the two capacitors 38b,39b, a bias is formed toward the integrated voltage value ⓑ in FIG. 5 of the capacitor 38b during the period of the first low speed regenerating head EP1, and a bias is formed toward the integrated voltage value ⓒ in FIG. 5 of the other capacitor 39b during the period of the second low speed regeneration head EP2, thereby forming a stepped shape ⓑ/ⓒ in FIG. 5.

Figure 4:
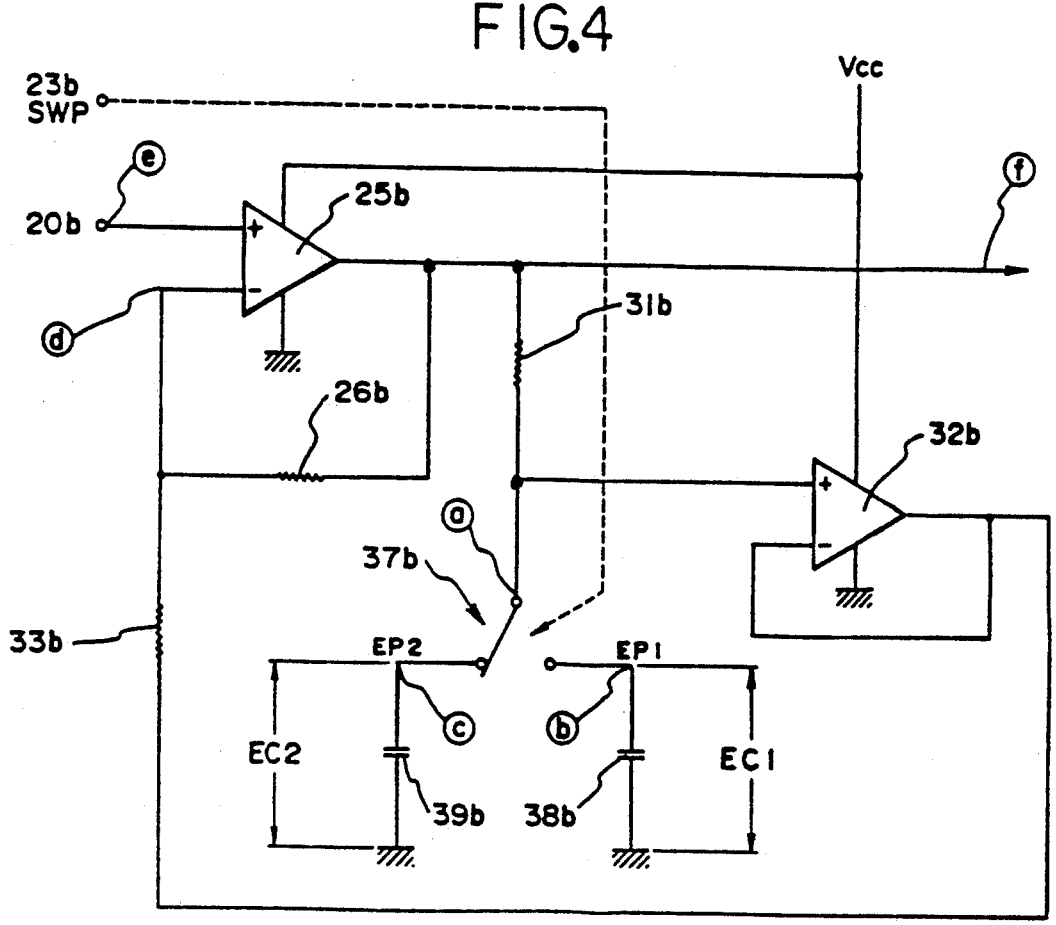
FIG. 4 is an electrical circuit schematic illustrating a detection circuit constructed according to the principles of the present invention.

Under such an operation, this time, the above signals are supplied to the non-inverting input terminal ⓔ in FIG. 4 of the arithmetic amplifier 25b, for example referring to FIG. 3B, in the form of the low speed regeneration envelope signals EEP,EEP1,EEP2 which are supplied to the input terminal ⓔ in FIG. 4.

In this case, the signals are the above described integrated voltages ⓑ/ⓒ in FIG. 5 which are fed back to the inverting input terminal ⓓ in FIG. 4 of the amplifier. To say it in more detail, the initial period is the period of the first low speed regenerating head EP1, and therefore, the first low speed regeneration envelope signals EEP1 have the wave pattern which corresponds to the integrated voltage RC1 ⓑ in FIG. 5 of the capacitor 38b. The difference signals which are formed between the above wave pattern and the integrated voltage ⓑ in FIG. 5 of the inverting input terminal are amplified with gains which are determined by the ratio of the value of the input resistor 33b to that of the feedback resistor 26b. As a result, during the initial period, the amplifier 25b outputs an output wave pattern ⓕ in FIG. 5 which varies around a wave center which corresponds to an offset output voltage VO (an output voltage which is outputted when the two inverting and non-inverting input terminals have the same potential).

The succeeding period is the period of the second low speed regenerating head EP2, and therefore, the wave pattern ⓔ/2 in FIG. 5 of the second low speed envelope signal EEP2 is supplied to the non-inverting input terminal ⓔ in FIG. 4 of the amplifier 25b in accordance with the integrated voltage EC2 (ⓒ in FIG. 5) of the capacitor 39b for the inverting input terminal ⓓ in FIG. 4 of the amplifier 25b. Under this condition, the difference signals which are formed between the two input terminals are amplified by the arithmetic amplifier 25b in the same manner as mentioned above, and thus, a wave pattern ⓕ/2 in FIG. 5 is obtained from the amplifier. This output wave pattern is also an integrated voltage EC2 (ⓒ in FIG. 5) which is switched for the inverting input terminal, and therefore, this wave pattern is varied around the wave pattern center which corresponds to the offset output voltage V0, in the same way as the case of the output wave pattern ⓕ/1 in FIG. 5 for the period of the first low speed regenerating head.

Thus, the wave pattern center position and the wave pattern shape as the periods of the regenerating heads EP1,EP2 are reflected, and the two integrated voltages EC1,EC2 which are separately maintained for the respective periods are used after switching them in match with the two incoming low speed regeneration envelopes EEP1,EEP2. Then the difference signals which are formed between the envelopes and the integrated voltages (used after switching) are amplified, thereby compensating the variations of the wave pattern shape and the wave center position for the periods of the regenerating heads.

Then, referring to FIG. 2, the output signals which are based on the integrated voltages EC1,EC2 (integrated from the arithmetic amplifier 32b to the condensers 38b,39b) are divided by the two resistors 34b,35b which form a voltage divider. Then, they are related to the two regeneration envelope signals EEP1,EEP2, and then, are supplied to the inverting input terminal of the succeeding comparator 36b in the form of first and second reference signals ERF1,ERF2 which proportionally responds to the integrated voltages which are based on the average values of the wave patterns of the regeneration envelope signals EEP1,EEP2. Here, if the damping value due to the voltage divider is assumed to be 0, the integrated voltages which are based on the average values L in FIG. 3C of the wave pattern form two reference signals ERF1,ERF2 for two periods. In actual, the integrated voltages are damped by a certain amount when passing through the voltage divider consisting of the resistors 34b,35b before forming the two reference signals ERF1,ERF2. Therefore, compared with the case that the integrated voltages become the reference signals, the duty ratio for the low speed recorded medium regeneration signal switching pulse SEP (FIG. 3D) (to be described in detail later) is heightened, with the result that the time period of the use of the low speed regenerating head is increased, and that the quality of the compensated regenerated picture is improved.

Now the compensating operation for the position of the wave center will be described referring to FIGS. 4 and 5, and, in order to clarify the conception, the description will be presented in a simplified form based on the assumption that the wave center positions as the periods of the first and second low speed regenerating heads EP1,EP2 are simultaneously received as the offset output voltages VO. The assumption is just a matter of principle which is attained in the case where the gain of the arithmetic amplifier 25b is infinite.

However, in actual, the gain of the amplifier 25b is limited, and the positions of the actual wave centers correspond to the voltages Vo' in FIG. 5 which are displaced up and down in a stepped form by small amounts around the above described offset output voltages VO.

In other words, the two integrated voltages EC1,EC2 of the two capacitors 38b,39b, and even the two reference signals ERF1,ERF2 for the periods of the arithmetic amplifier 32b fluctuate up and down within the upper and lower limit values of the voltage Vo' in FIG. 5 which fluctuates in a stepped form in the period.

Meanwhile, the output signals EEPO (ⓕ/1, ⓕ/2 in FIG. 5) which have undergone the wave center position compensations at the arithmetic amplifier 25b are supplied to the inverting input terminal of the comparator 36b. The comparator 36b matches the above mentioned output signals with two periods respectively, and compares them with the two reference signals ERF1,ERF2 for the period.

If the output signals EEPO are smaller in their magnitudes than the reference signals ERF1,ERF2, a transition is made to a state of "0", and the low speed recorded medium regeneration signal switching pulse SEP (FIG. 3D) is supplied to the low speed recorded medium regeneration signal switching pulse output terminal 21b.

When such comparisons and discriminations are made, the two reference signals ERF1,ERF2 follow the two wave center positions of the two periods, which fluctuate up and down by small amounts, and therefore, the compare-discriminations are made based on the respective average values which accurately reflect the wave contours and the wave center positions for the period.

Thus, a solution is obtained for the problem that the wave contours and the wave center positions related to the two regeneration envelope signals EEP1, EEP2 are different from each other (FIG. 3B). Therefore, the output terminal of the comparator 36b outputs the low speed recorded medium regeneration signal switching pulse SEP for bringing a state of "0" (i,j in FIG. 3D) for the period in which the two regeneration envelope signals EEP1,EEP2 are uniformly damped by a certain amount.

Referring to FIG. 1, such a regeneration signal switching pulse SEP is supplied through the low speed recorded medium regeneration signal switching pulse output terminal 21b to the shifting switch C which is the variable speed regeneration compensating circuit switch. This switch C is positioned (as shown in the drawing) such that its movable contact is contacted with the second fixed contact during the low speed recorded medium variable speed regeneration.

Therefore, the switching pulse SEP passes through the switch C, and, in this case, controls the switching operation of the analogue switching circuit 10 which plays the role of a low speed recorded medium regeneration signal switching means.

Now, description will be made referring to FIG. 2 for the case where the regeneration speed signals HS/LS which pass through the regeneration speed signal input terminal 22b are shifted to a state of "0" which represents a low speed regeneration such as a still picture. In such a case, the output terminal of the switching circuit 30b which is the regeneration speed switching means is electrically connected to the first input terminal (an inverse state to that illustrated).

Therefore, the output terminal of the arithmetic amplifier 25b is connected to one of the time constant circuits (consisting of a resistor 28b and a capacitor 29b) in a stabilized form without being accompanied by switching operations, so that an integrated voltage should be supplied to the non-inverting input terminal of the succeeding arithmetic amplifier 32b in a stabilized manner.

In the case of a still regeneration, the first and second low speed regeneration envelope signals EEP1, EEP2 which appear in two separate periods are repeating wave patterns if the time series for one of them is taken into account. Further, if a mutual comparison of the first and second envelope signals is taken into account, difference projections can be formed in different shapes, as is well known.

In this case, as in the case of the variable speed regeneration, the two integrated voltages KC1, KC2 are obtained not through the two time constant circuits corresponding to the first and second low speed regeneration envelope signals EEP1, EEP2, but a single integrated voltage is obtained through a single time constant circuit by passing the first and second envelope signals through the time constant circuit, and by adding into a single period the two periods allocated to the first and second envelope signals, this being more effective for the operation.

This applies to low speed regenerations other than a still regeneration. That is, the first and second low speed envelope signals EEP1, EEP2 are supplied through the arithmetic amplifier 25b to the time constant circuit consisting of the resistor 28b and the condenser 29b, and the integrated voltage therefrom is supplied to the non-inverting input terminal of the arithmetic amplifier 32b after passing through the regeneration speed shifting switch 30b which is closed on the side of LS in FIG. 2.

The operations thereafter are same as that of the above described variable speed regeneration. Ultimately, a low speed recorded medium regeneration signal switching pulse SEP such as a still state of "0" is outputted from the succeeding comparator 36b during the period of a wave portion having a significant damping in relation with the first and second low speed regeneration envelope signals EEP1, EEP2 which appear during the period when the two periods allocated are combined into one.

The regeneration speed signals HS/LS which arrive at the regeneration speed signal input terminal 22b as shown in FIG. 1 are supplied to the regeneration speed detecting circuit D in order to show the regeneration speed which is determined by the low speed recorded medium regeneration signal switching pulse SEP which is in turn outputted from the output terminal 21b. Instead, it is up to the designer's preference that an independent regeneration speed detecting circuit F such as a tacho generator interlocked with a capstan motor E is connected to the regeneration speed signal input terminal 24B.

According to the present invention as described above, in the case where a variable speed regeneration is carried out by means of a low speed regenerating head on a low speed recorded medium, the low speed recorded medium variable speed regeneration compensating circuit B which is selectively operated receives the first and second low speed regeneration envelope signals EEP1,EEP2 from the low speed regeneration envelope detecting circuit 8. In response to the regeneration head switching pulse SWP, the time constant circuit switching means 37b which performs switching operations switches in an alternate manner the first and second low speed regeneration envelope signals EEP1,EEP2, and supplies them to the first time constant circuit consisting of the resistor 31b and the condenser 38b, and also supplies them to the second time constant circuit consisting of the resistor 31b and the condenser 39b.

Thus, the first and second integrated voltages are alternately stored in the first and second time constant circuit, and thus, the separate integraged voltages are alternately switched and alternately outputted by means of a single time constant switching means 37b, so that the first and second reference signals ERF1,ERF2 should be formed by the first and second integrated voltages.

In response to the first and second reference signals and to the first and second low speed regeneration envelope signals, the low speed recorded medium regeneration signal switching pulse generating means 36b outputs a low speed recorded medium regeneration signal switching pulse SEP. In response to the pulse SEP, the low speed recorded medium regeneration signal switching means 10 switches the low speed regeneration signals VEP to the standard speed regeneration signals VSP, so that the signals should be outputted in the form of the low speed recorded medium compensated regeneration signals VSEP.

Even in the case where a picture data having undergone a low speed recording is subjected to a variable speed regeneration by means of the low speed regenerating heads EP1,EP2, the regenerated picture data which is simultaneously regenerated by the standard speed regenerating heads is inserted in place of the stripe shaped or strip shaped optical noises caused by cross talks and partial degradations of the regenerated picture data, thereby carrying out the compensations. Therefore, the compensation is extended not only to the case where the picture data having undergone a standard speed recording which is subjected to a variable speed regeneration by means of the standard speed regenerating heads SP1,SP2, but also to the medium having undergone a low speed recording, thereby effectively eliminating the stripe shaped optical noises.

As a result, in the case of a low speed regeneration, the use of video tapes becomes enormously more convenient, as well as increasing the use of the low speed recording/regenerating of video tapes. Further, the operation costs of video tape recorders are gradually decreased, thereby creating propagative effects.

What is claimed is:

1. A double azimuth 4-head type video tape recorder comprising:

first and second standard speed regenerating heads oppositely disposed on a revolving drum at an angle of 180 degrees, and having external circumferential surfaces inclinedly facing a strip shaped running recording medium;

first and second low speed regenerating heads oppositely disposed at an angle of 180 degrees, and each positioned adjacent to a different one of said first and second standard speed regenerating heads;

standard speed regeneration head switching means for generating a selected standard speed regenerating signal by alternatively switching between standard speed regenerating signals of one of said first and second standard speed regenerating heads in dependance upon which one of said first and second standard speed regenerating heads is facing said strip shaped running recording medium in response to a regenerating head switching pulse, said regenerating head switching pulse being in a first state during the interval of 180 degrees of said revolving drum with said first standard speed regenerating head and said second low speed regenerating head facing said strip shaped running recording medium and being in a second state during the interval of 180 degrees of said revolving drum with said second standard speed regenerating head and said first low speed regenerating head facing to said strip shaped running recording medium;

low speed regeneration head switching means for generating a selected low speed regenerating signal by selectively switching between low speed regenerating signals of one of said first and second low speed regenerating heads in dependence upon which one of said first and second low speed regenerating heads is facing said strip shaped running recording medium in response to said regenerating head switching pulse;

standard speed regeneration envelope detecting means for generating a standard speed regeneration envelope being a detected envelope of said selected standard speed regenerating signal;

low speed regeneration envelope detecting means for generating a low speed regeneration envelope signal being a detected envelope of said selected low speed regenerating signal;

envelope comparing means for generating a standard speed recorded medium regeneration signal switching pulse being in a first state when said standard speed regeneration envelope is larger than said low speed regeneration envelope signal and being in a second state for compensating for said first state when said standard speed regeneration envelope signal is smaller than said low speed regeneration envelope signal according to comparisons of magnitudes of said standard and low speed regeneration envelope signals;

standard speed recorded medium regeneration signal switching means for generating a standard speed recorded medium compensated regenerating signal by selecting and switching a greater one of said standard speed and low speed regenerating signals, in response to said standard speed recorded medium regeneration signal switching pulse of said envelope comparing means during a variable-speed regeneration for a standard recorded mediums; and a low speed recorded medium variable speed regeneration compensating circuit, comprising;

first time constant means for supplying a first average of said low speed regeneration envelope signal for said first low speed regenerating head, second time constant means for supplying a second average of said low speed regeneration envelope signal for said second low speed regenerating head, time constant circuit switching means for alternatively supplying said first average and said second average of said first and second time constant means in response to said regeneration head switching pulse during variable speed regeneration of a low speed recorded medium, and low speed recorded medium regeneration signal switching pulse generating means for generating a low speed recorded medium regeneration signal switching pulse when said low speed regeneration envelope signals smaller than first and second reference signals by comparing said first average and said second average supplied by said time constant circuit switching means;

wherein said low speed recorded medium regeneration signal switching means switches said low speed regenerating signal to said standard speed regenerating signal to be generated as a low speed recorded medium compensated regenerating signal in response to said low speed recorded medium regeneration signal switching pulse.

2. A four-head video tape recorder, comprising:

a first standard speed regenerating head for generating first standard speed head signals, a second standard speed regenerating head for generating second standard speed head signals, a first low speed regenerating head for generating first low speed head signals, and a second low speed regenerating head for generating second low speed head signals;

standard speed regeneration head switching means for alternatively providing said first standard speed head signals and said second standard speed head signals as standard speed regenerating signals in response to regeneration head switching pulses;

low speed regeneration head switching means for alternatively providing said first low speed head signals and said second low speed head signals as low speed regenerating signals in response to said regeneration head switching pulses;

analog switching means for generating output regeneration signals by alternatively providing one of said standard speed regenerating signals and said low speed regenerating signals in response to signal switching pulses;

variable speed regeneration compensating means for detecting first average values being functions of said first low speed head signals, for detecting second average values being functions of said second low speed head signals, and for generating said signal switching pulses at least during variable speed regeneration in response to said first average values and said second average values.

3. A four-head video tape recorder, comprising:
first standard speed regenerating head means for generating first standard speed head signals from a video tape;
second standard speed regenerating head means for generating second standard speed head signals from said video tape;
first low speed regenerating head means for generating first low speed head signals from said video tape;
second low speed regenerating head means for generating second low speed head signals from said video tape;
standard speed regeneration head switching means for alternatively providing said first standard speed head signals and said second standard speed head signals as standard speed regenerating signals in response to regeneration head switching pulses;
low speed regeneration head switching means for alternatively providing said first low speed head signals and said second low speed head signals as low speed regenerating signals in response to said regeneration head switching pulses;
analog switching means for generating output regeneration signals by alternatively providing one of said standard speed regenerating signals and said low speed regenerating signals in response to signal switching pulses;
low speed envelope detecting means for detecting first envelope signals and second envelope signals of said first low speed head signals and said second low speed head signals, respectively; and
variable speed regeneration compensating means for generating said signal switching pulses in response to said first envelope signals and said second envelope signals after compensating for average level differences between said first envelope signals and said second envelope signals.

4. A four-head video tape recorder as claimed in claim 3, wherein said variable speed regeneration compensating means comprises:
average value means for generating first average value signals being a function of a time average of said first envelope signals, and for generating second average value signals being a function of a time average of said second envelope signals; and
means for regulating levels of said first envelope signals and said second envelope signals in response to said first average value signals and said second average value signals, respectively, to generate regulated signals, and for generating said signal switching pulses in response to said the regulated signals.

5. A four-head video tape recorder as claimed in claim 4, wherein said average value means comprises:
a first time constant circuit;
a second time contact circuit; and
means for alternately connecting said first time constant circuit and said second time constant circuit to said level regulating means in response to said regeneration head switching pulses.

6. A four-head video tape recorder as claimed in claim 4, level regulating means comprises first means for comparing said first envelope signals and said second envelope signals received at a first input terminal with said first average value signals and said second average value signals received at a second input terminal to generate said regulated signals.

7. A four-head video tape recorder as claimed in claim 6, wherein said level regulating means further comprises second means for comparing said regulated signals with said first average value signals and said second average value signals to generate said signal switching pulses.

8. A four-head video tape recorder as claimed in claim 3, wherein said variable speed regeneration compensating means comprises:
first means for comparing said first envelope signals and said second envelope signals received at a first input terminal with first average value signals and said second average value signals received at a second input terminal from a feedback path to generate comparisons;
means for generating said first average value signals and said second average value signals by alternately applying said comparisons to different voltage storage circuits; and
second means for comparing first comparisons with said first average value signals and said second average value signals to generate said signal switching pulses.

9. A four-head video tape recorder as claimed in claim 3, wherein said variable speed regeneration compensating means further comprises voltage following means for providing a high input impedance path between said means for generating said first average value signals and said second average value signals and said first comparing means and said second comparing means.

10. A four-head video tape recorder as claimed in claim 3, wherein said variable speed regeneration compensating means compensates for the average level differences between said first envelope signals and said second envelope signals during variable speed regeneration of a recording made on an extended play setting.

11. A method for performing variable speed reproduction of video signals recorded on a video tape in a four-head video tape recorder, said method comprising:
generating first standard speed head signals from said video tape;
generating second standard speed head signals from said video tape;
generating first low speed head signals from said video tape;
generating second low speed head signals from said video tape;
alternatively providing said first standard speed head signals and said second standard speed head signals as standard speed regenerating signals in response to regeneration head switching pulses;
alternatively providing said first low speed head signals and said second low speed head signals as low speed regenerating signals in response to said regeneration head switching pulses;
generating output regeneration signals by alternatively providing one of said standard speed regenerating signals and said low speed regenerating signals in response to signal switching pulses;
detecting first envelope signals and second envelope signals of said first low speed head signals and said second low speed head signals, respectively; and generating said signal switching pulses in response to said first envelope signals and said second envelope signals after compensating for average level differences between said first envelope signals and said second envelope signals.

12. A method as claimed in claim 11, wherein said compensating for average level differences between said first envelope signals and said second envelope signals comprises generating first average level signals and second average level signals by integrating said first envelope signals and said second envelope signals, respectively, over time.

13. A method as claimed in claim 12, wherein said compensating for average level differences between said first envelope signals and said second envelope signals further comprises changing average levels of said first envelope signals and said second envelope signals in response to said first average level signals and second average level signals, respectively, before generating said signal switching pulses in response to comparisons between thresholds and said first envelope signals and said second envelope signals.

14. A method as claimed in claim 13, wherein said thresholds are said first average level signals and second average level signals.

15. A four-head video tape recorder as claimed in claim 2, wherein said variable speed regeneration compensating means comprises:
average value means for generating first average value signals being a function of a time average of first envelope signals, and for generating second average value signals being a function of a time average of second envelope signals; and
means for regulating levels of said first envelope signals and said second envelope signals in response to said first average value signals and said second average value signals, respectively, to generate regulated signals, and for generating said signal switching pulses in response to said regulated signals.

16. A four-head video tape recorder as claimed in claim 15, wherein said average value means comprises:
a first time constant circuit;
a second time constant circuit; and
means for alternately connecting said first time constant circuit and said second time constant circuit to said level regulating means in response to said regeneration head switching pulses.

17. A four-head video tape recorder as claimed in claim 15, wherein said means for regulating levels of said first envelope signals and said second envelope signals comprises first means for comparing said first envelope signals and said second envelope signals received at a first input terminal with said first average value signals and said second average value signals received at a second input terminal to generate said regulated signals.

18. A four-head video tape recorder as claimed in claim 17, wherein said means for regulating levels of said first envelope signals and said second envelope signals further comprises second means for comparing said regulated signals with said first average value signals and said second average value signals to generate said signal switching pulses.

19. A four-head video tape recorder as claimed in claim 2, wherein said variable speed regeneration compensating means comprises:
first means for comparing first envelope signals and second envelope signals received at a first input terminal with first average value signals and second average value signals received at a second input terminal from a feedback path to generate comparisons;
means for generating said first average value signals and said second average value signals by alternately applying said comparisons to different voltage storage circuits; and
second means for comparing first comparisons with said first average value signals and said second average value signals to generate said signal switching pulses.

20. A four-head video tape recorder as claimed in claim 19, wherein said variable speed regeneration compensating means further comprises voltage following means for providing a high input impedance path between said means for generating said first average value signals and said second average value signals and said first comparing means and said second comparing means.

21. A four-head video tape recorder as claimed in claim 19, wherein said variable speed regeneration compensating means compensates for the average level differences between said first envelope signals and said second envelope signals during variable speed regeneration of a recording made on an extended play setting.

* * * * *

UNITED STATES PATENT AND TRADEMARK OFFICE
CERTIFICATE OF CORRECTION

PATENT NO. : 5,319,499
DATED : June 7, 1994
INVENTOR(S) : Yang L. Kim, et al

It is certified that error appears in the above-indentified patent and that said Letters Patent is hereby corrected as shown below:

ON THE TITLE PAGE

IN ITEM [75], Change the inventor's name "Yang L. Kim" to --Yang Lack, KIM--.

Column 7, line 20, change "$0_{\rightleftarrows}$" to --"0".

Column 16, line 36, change "EC1-" to --EC1--.

Column 20, line 13, change ";" to --:--.

Signed and Sealed this

Fourth Day of July, 1995

Attest:

BRUCE LEHMAN

Attesting Officer     Commissioner of Patents and Trademarks